United States Patent
Kikuchi

(10) Patent No.: US 8,017,896 B2
(45) Date of Patent: Sep. 13, 2011

(54) VEHICLE ACCESSORY HAVING A REAR LIGHT RECEIVING SENSOR FOR MEASURING ILLUMINATION INTENSITY INSIDE THE VEHICLE

(75) Inventor: Hideyuki Kikuchi, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 286 days.

(21) Appl. No.: 12/466,003

(22) Filed: May 14, 2009

(65) Prior Publication Data

US 2010/0026035 A1 Feb. 4, 2010

(30) Foreign Application Priority Data

Jul. 29, 2008 (JP) .................................. 2008-195334

(51) Int. Cl.
*G01J 1/32* (2006.01)
(52) U.S. Cl. .................................. 250/205; 250/214 AL
(58) Field of Classification Search ............ 250/214 AL, 250/214 B, 205, 214 R, 214 D, 214 LS; 359/229, 359/602–608; 345/1.1, 7–9, 173–176, 87
See application file for complete search history.

(56) References Cited

U.S. PATENT DOCUMENTS 7,567,222 B2 * 7/2009 Tanaka et al. .................... 345/7

FOREIGN PATENT DOCUMENTS

| JP | 56-74331 (U) | 6/1981 |
| JP | 5-35494 | 5/1993 |
| JP | 7-329566 | 12/1995 |
| JP | 2006-522699 | 10/2006 |
| JP | 2007-125984 | 5/2007 |
| JP | 2008-044603 | 2/2008 |
| WO | WO 2005/014319 A1 | 2/2005 |

OTHER PUBLICATIONS

Office Action issued Nov. 9, 2010, in Japan Patent Application No. 2008-195334.

* cited by examiner

*Primary Examiner* — Que T Le
(74) *Attorney, Agent, or Firm* — Oblon, Spivak, McClelland, Maier & Neustadt, L.L.P.

(57) ABSTRACT

The present invention provides a vehicle accessory which reliably blocks the sunlight without any mechanical operation. The vehicle accessory includes: a light controlling sheet which is attached to the windshield of a vehicle, and of which light transmittance changes according to a value of voltage; and a rear view mirror which insures a rear view of the vehicle. The rear view mirror has a front light receiving sensor which measures illumination intensity of the sunlight which enters from the front of the vehicle, a rear light receiving sensor which measures illumination intensity inside the vehicle, and a circuit board which controls voltage to be applied to the light controlling sheet. When a combination of the illumination intensity of the sunlight received by the front light receiving sensor and the illumination intensity inside the vehicle received by the rear light receiving sensor is a combination stored in storage unit in advance, the circuit board applies voltage to the light controlling sheet.

4 Claims, 11 Drawing Sheets

VEHICLE ACCESSORY HAVING A REAR LIGHT RECEIVING SENSOR FOR MEASURING ILLUMINATION INTENSITY INSIDE THE VEHICLE

CROSS-REFERENCE TO RELATED APPLICATIONS

The disclosure of Japanese Patent Application No. JP2008-195334 filed on Jul. 29, 2008 including the specification, drawings and abstract is incorporated herein by reference in its entirety.

BACKGROUND OF THE INVENTION

1. Field of the Invention

The present invention relates to a vehicle accessory including a light controlling sheet which is attached to the windshield, and functions as a sun visor, and a rear view mirror for insuring a rear view of the vehicle.

2. Related Background Art

When a vehicle is traveling, sunlight may enter the eyes of the driver, making it difficult to view to the front due to glare. A sun visor, as disclosed in Japanese Patent Application Laid-Open No. H7-329566, is used to suppress the glare. This sun visor, according to Japanese Patent Application Laid-Open No. H7-329566, is comprised of a case, which is secured in the upper part of the wind shield, a light shielding plate retractable housed in the case, and two light receiving sensors which protrude from the case and detect sunlight that enters from the front of the vehicle. One light receiving sensor is located slightly lower than the line of sight of the driver, and the other light receiving sensor is located on a line connecting the incident light of the sunlight and the line of sight of the driver. While at least one of the light receiving sensors is detecting light, the light shielding plate protrudes from the case to block the sunlight. When light is not detected by either light receiving sensor, the light shielding plate is retracted and housed in the case.

In the case of the above mentioned sun visor according to Japanese Patent Application Laid-Open No. H7-329566, the configuration is complicated because mechanical movement is involved. The positions of the two light receiving sensors must also be adjusted accurately, and if this adjustment is insufficient, the light shielding plate may not protrude from the case even if the driver experiences glare.

SUMMARY OF THE INVENTION

With the foregoing in view, it is an object of the present invention to provide a vehicle accessory which can easily block sunlight without involving mechanical operation.

A vehicle accessory of the present invention has: a light controlling sheet which is attached on a windshield of a vehicle, and of which light transmittance changes according to a value of voltage; and a rear view mirror which insures rear view of the vehicle, wherein a rear view mirror has: a front light receiving sensor which measures illumination intensity of the sunlight which entered from the front of the vehicle; a rear light receiving sensor which measures illumination intensity inside the vehicle; and a circuit board which controls voltage to be applied to the light controlling sheet, and the circuit board has: storage unit for storing, in advance, combinations of the illumination intensity of the sunlight and illumination intensity of the vehicle, for applying voltage to the light controlling sheet; and voltage output unit for comparing a combination of illumination intensity of the sunlight received by the front light receiving sensor and illumination intensity in the vehicle received by the rear light receiving sensor, with the combination stored in the storage unit, and applying voltage to the light controlling sheet based on the comparison result.

According to this vehicle accessory, the sunlight can be blocked by changing the light transmittance of the light controlling sheet attached to the windshield. Therefore the light can be blocked more electrically compared with devices which move components mechanically.

A driver experiences the glare of sunlight, not when the sun is above the driver, but when the sun is viewed through the windshield. When the sun is above the driver and cannot be viewed by the driver, it is bright outside the vehicle and dark inside the vehicle. When the sun is visible through the windshield, both the outside and inside of the vehicle are bright since sunlight enters the vehicle. Therefore, by measuring illumination intensity of sunlight from the front of the vehicle by the front light receiving sensor and measuring illumination intensity in the vehicle by the rear light receiving sensor, it can be judged whether sun is at a glare position, that is, whether light should be blocked. If the necessity of blocking light is judged merely by illumination intensity of the sunlight, a direction in which the driver experiences glare and the direction of the front light receiving sensor must be adjusted accurately, but if not only the illumination intensity of the sunlight, but also the illumination intensity in the vehicle are measured, and the light controlling sheet is operated based on the combination thereof, then the sunlight by which the driver experiences glare can always be blocked by the light controlling sheet, even if the position of the front light receiving sensor has deviated somewhat.

According to this vehicle accessory, combination of the illumination intensity of the sunlight and the illumination intensity in the vehicle are stored in the storage unit in advance, a combination of the illumination intensity of the sunlight received by the front light receiving sensor and an illumination intensity in the vehicle received by the rear light receiving sensor is compared with the combinations stored in the storage unit, and voltage is applied to the light controlling sheet based on the comparison result. By storing a plurality of combinations in the storage unit, applying of voltage to the light controlling sheet can be finely controlled.

It is preferable that the rear view mirror has a mirror housing which supports the mirror plate, and a base which is connected to the mirror housing via a stay, and is fixed to the windshield, and the front light receiving sensor is housed in the base. According to the vehicle accessory, the position of the front light receiving sensor does not change even if the mirror housing is moved, so the position of the front light receiving sensor with respect to the windshield can be constantly maintained, even if the driver changes direction of the mirror housing so as to adjust the angle of the mirror plate.

It is also preferable that a cylindrical portion having an opening on the windshield side is formed in the base, and the front light receiving sensor is disposed in a space of the cylindrical portion at a position recessed from the opening. According to this vehicle accessory, if an angle formed by an axis of the hole of the cylindrical portion and the sun increases, sunlight no longer enters the hole of the cylindrical portion, and the front light receiving sensor located at a position recessed from the opening of the cylindrical portion does not receive sunlight. Therefore the measured illumination intensity of the front light receiving sensor can be greatly changed between the sunlight from the direction where the driver is bothered by glare, and the sunlight from the direction where the driver is not bothered by glare. As a result, the light controlling sheet can be operated more accurately.

It is also preferable that the rear view mirror has position adjustment unit for moving the front light receiving sensor along the axis of the hole of the cylindrical portion. The mounting angle of the base with respect to the traveling direction of the vehicle changes depending on the inclination of the windshield. If this angle changes, the light receiving angle of the front light receiving sensor housed in the base changes, and the sunlight subjecting the driver to glare is no longer received. The position adjustment unit allows moving the front light receiving sensor closer to or away from the opening of the cylindrical portion, and as a result, the sunlight from the direction where the driver experiences glare can always be received by the front light receiving sensor, and the light controlling sheet can be operated more accurately.

Figure 4:
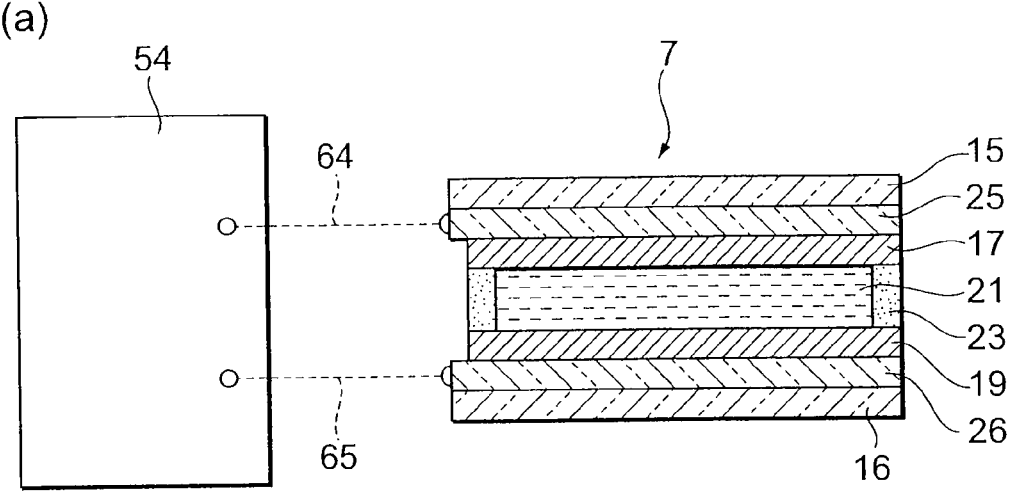
Figure 4:
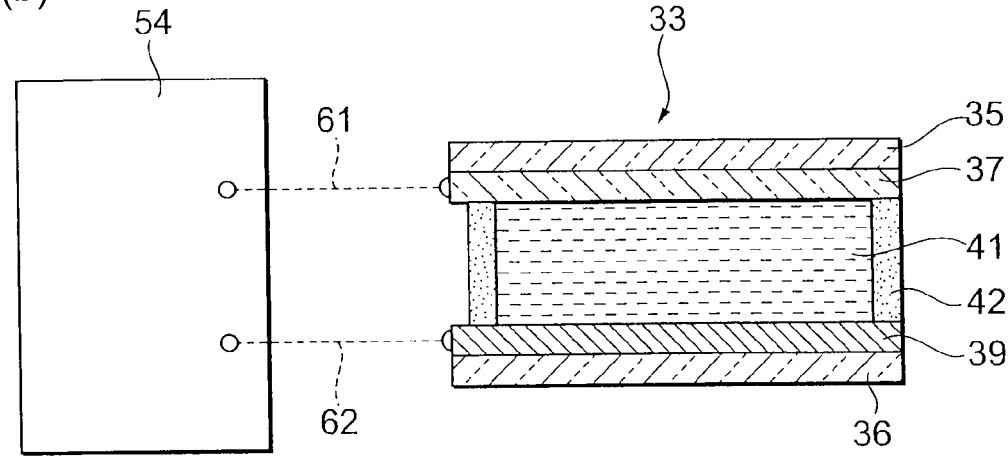
Figure 5:
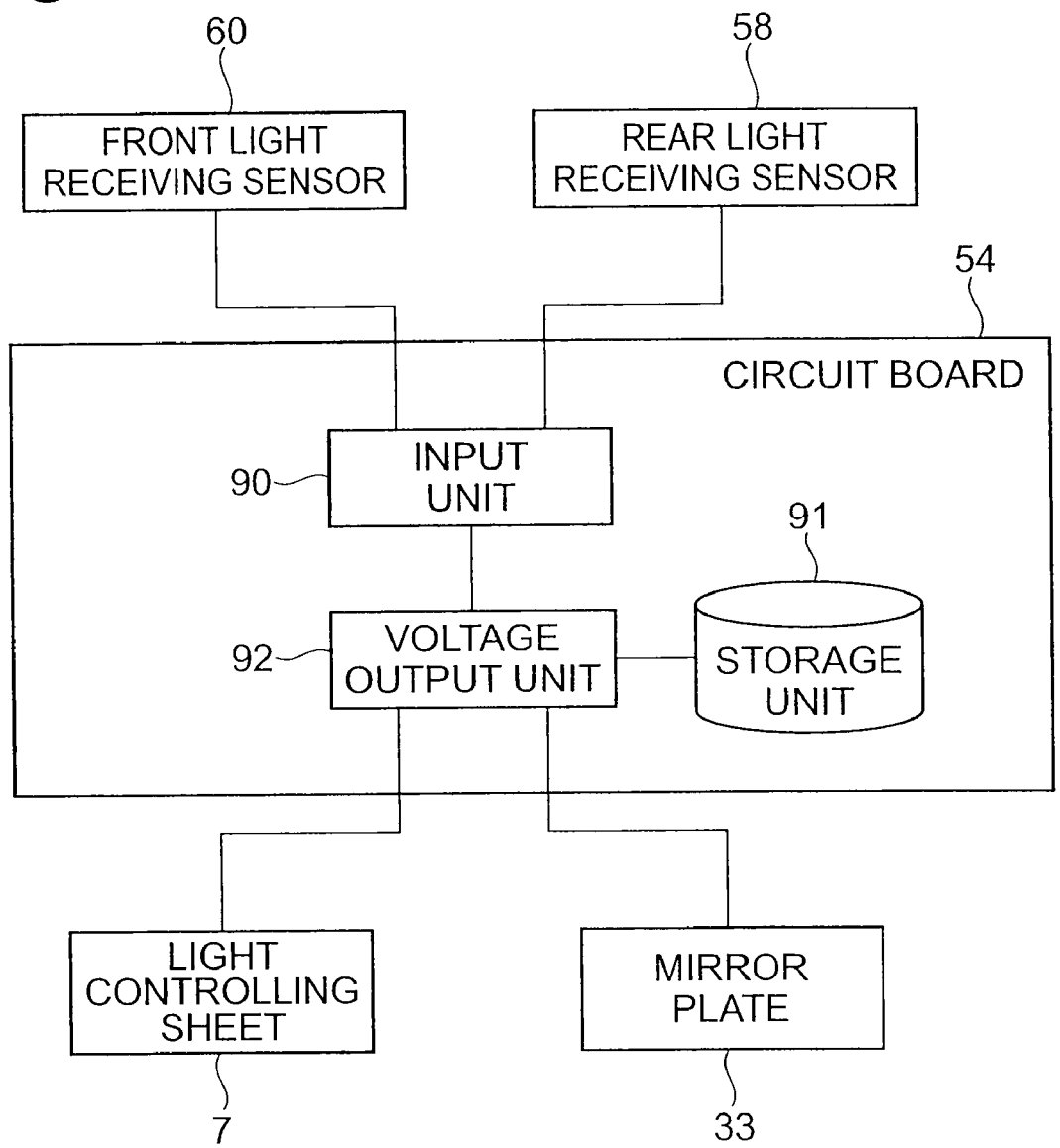
Figure 6:
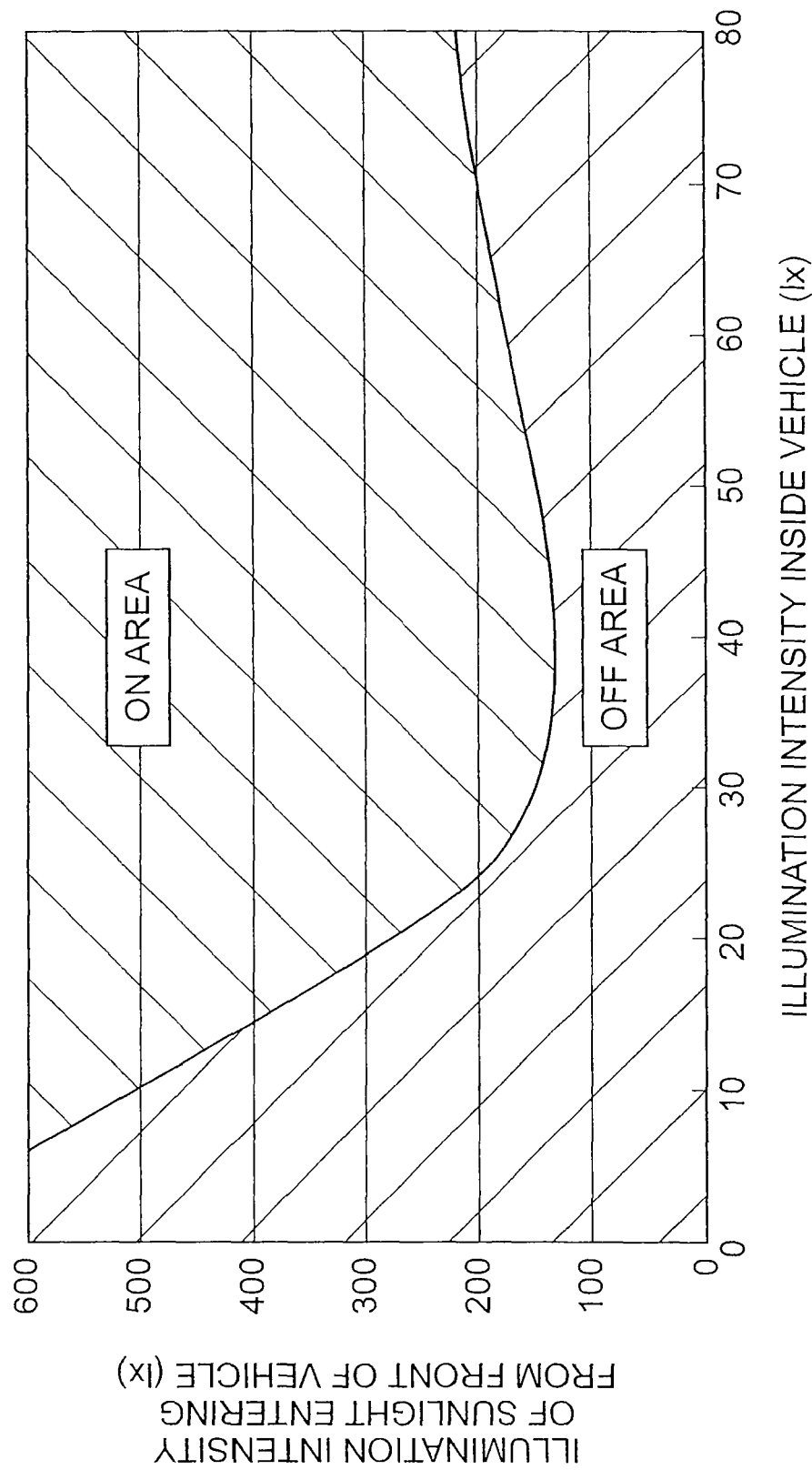
Figure 7:
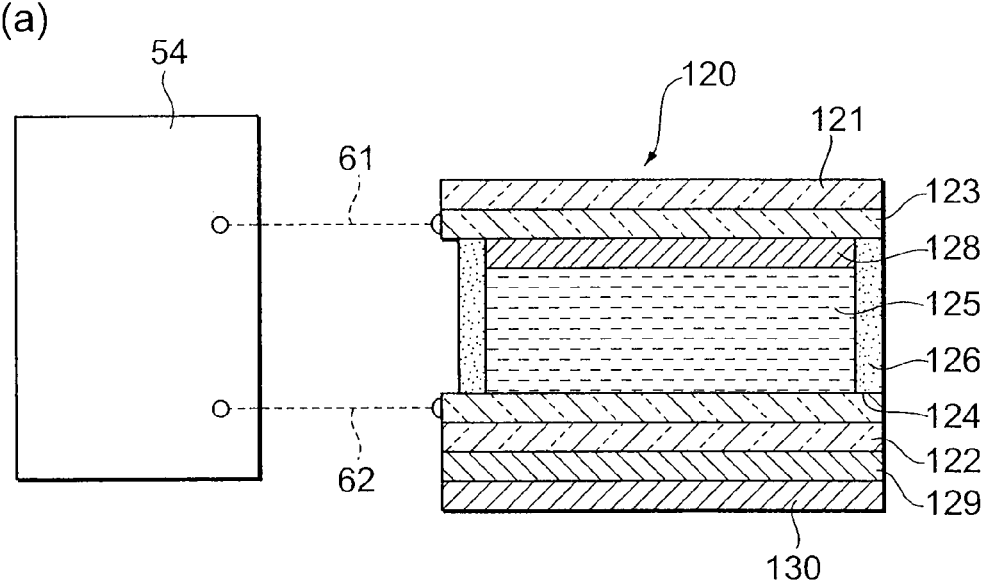
Figure 7:
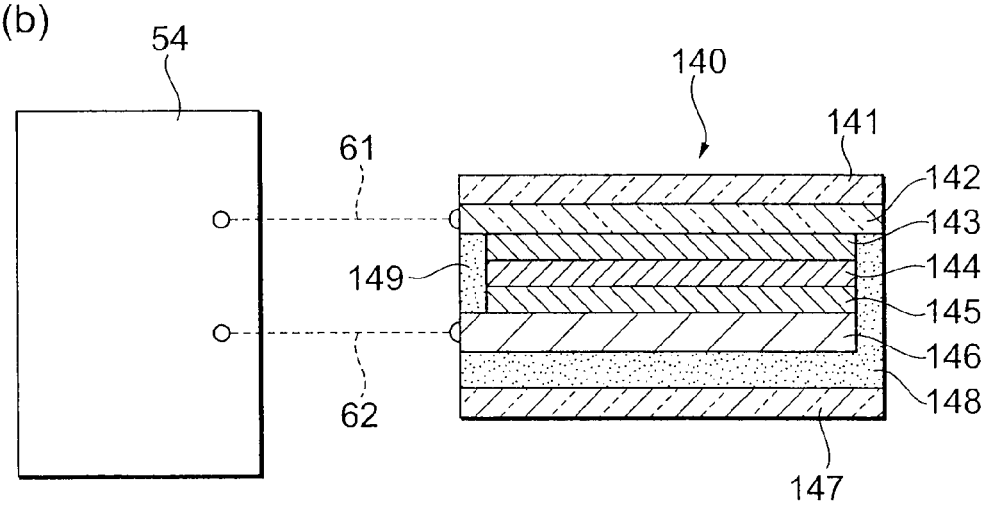
Figure 8:
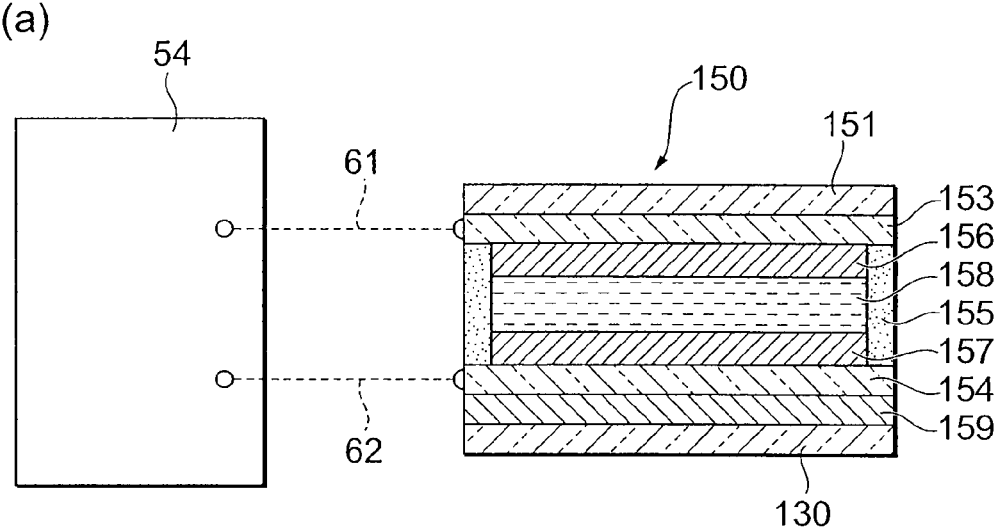
Figure 8:
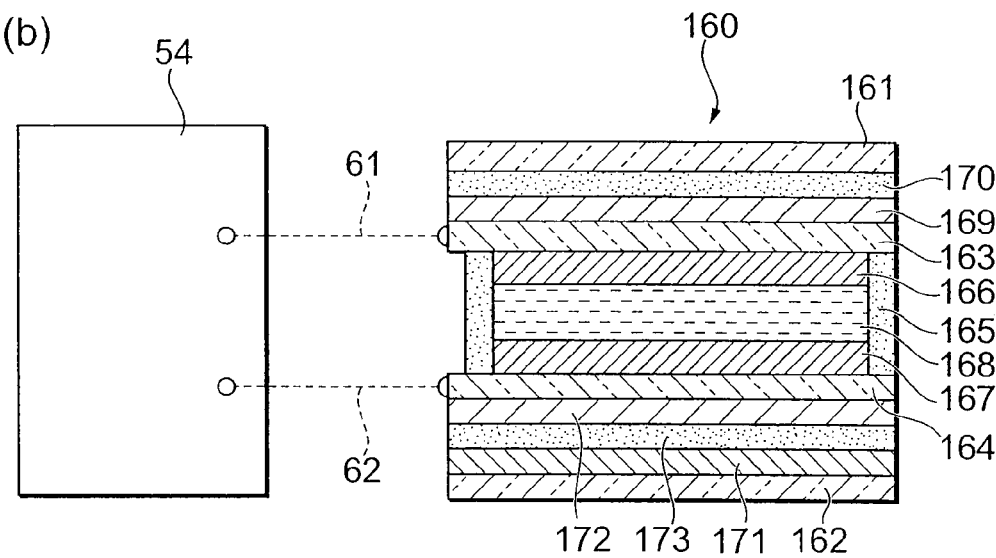
Figure 9:
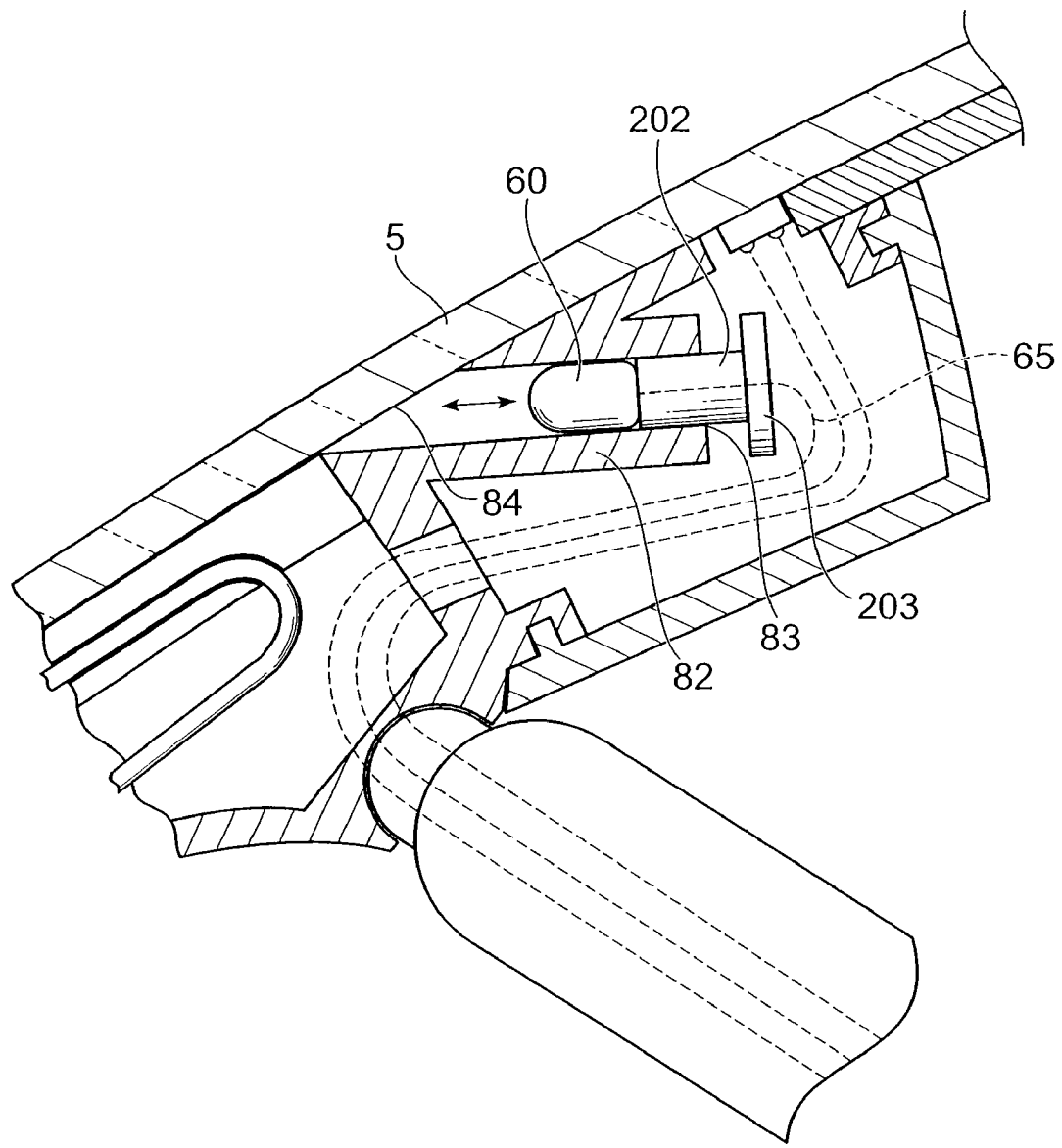
Figure 10:
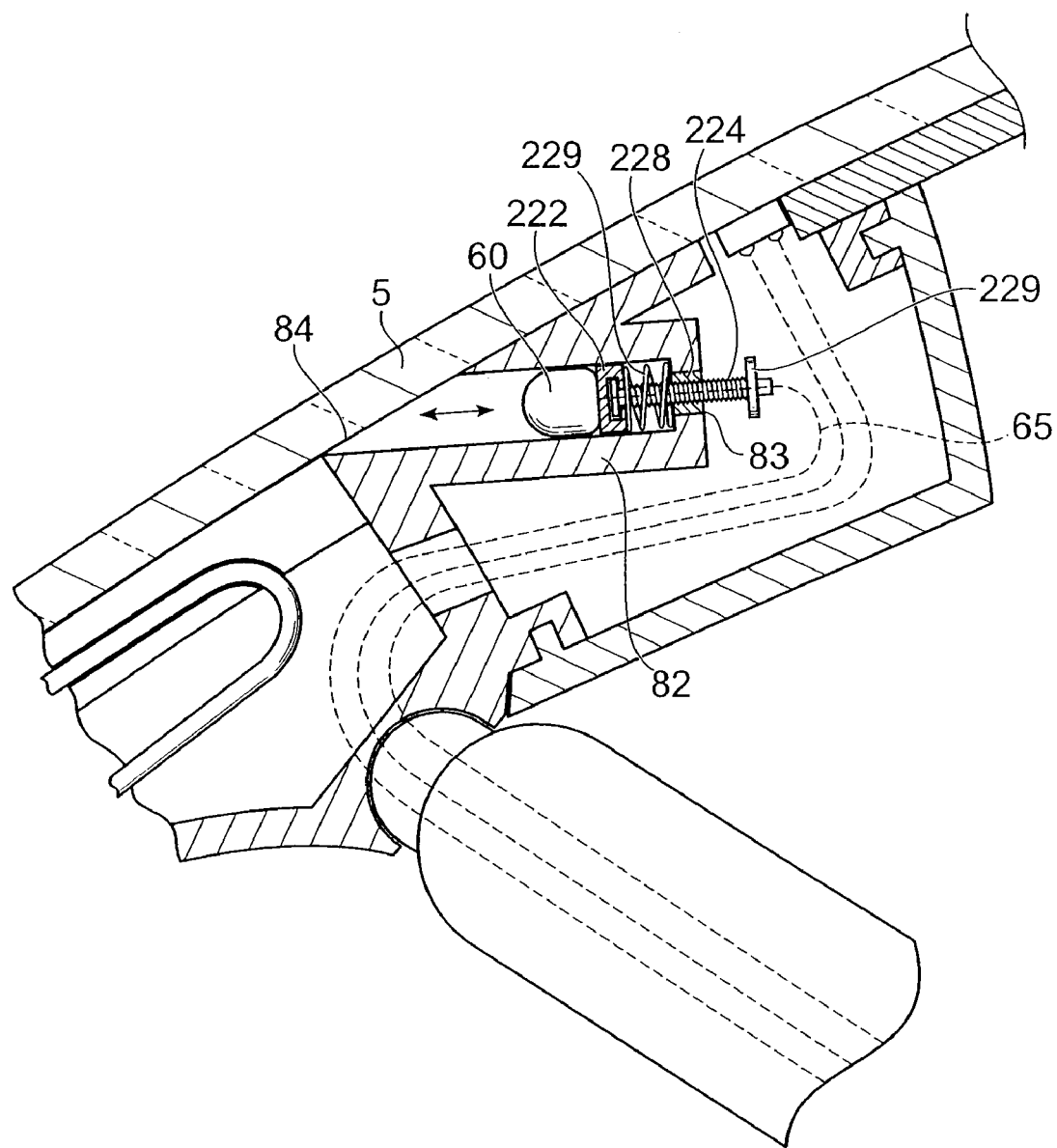
Figure 11:
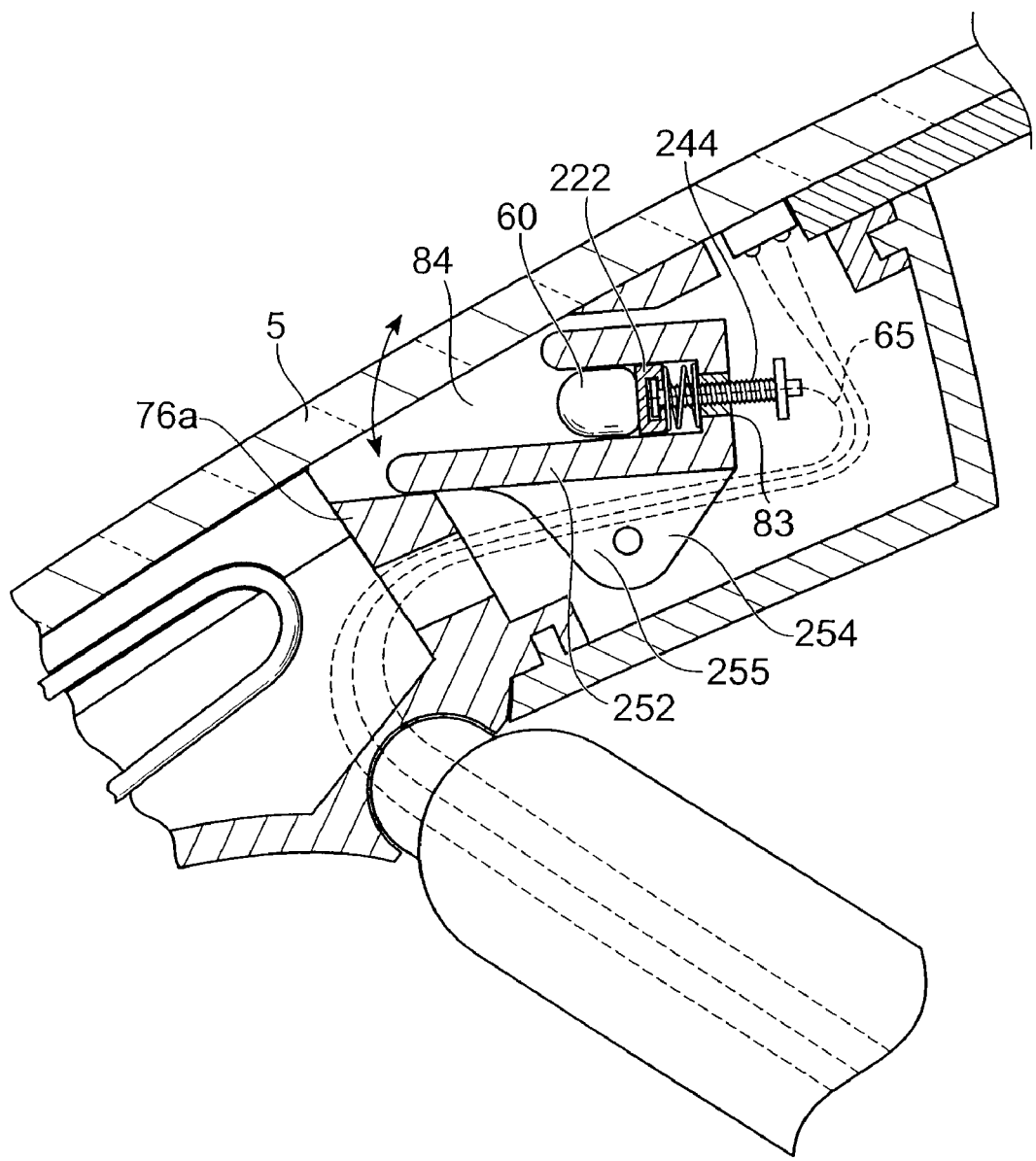

(a) of FIG. 4 is a cross-sectional view depicting a mirror plate according to the first embodiment, and (b) of FIG. 4 is a cross-sectional view depicting a light controlling sheet according to the first embodiment;

FIG. 5 is a block diagram depicting a circuit board according to the first embodiment;

FIG. 6 is a graph depicting a relationship of the illumination intensity of the sunlight which enters from the front of the vehicle, the illumination intensity in the vehicle, and the glare that the driver experiences;

(a) of FIG. 7 is a cross-sectional view depicting a first modification of the mirror plate, and (b) of FIG. 7 is a cross-sectional view depicting a second modification of the mirror plate;

(a) of FIG. 8 is a cross-sectional view depicting a third variant form of the mirror plate, and (b) of FIG. 8 is a cross-sectional view depicting a fourth variant form of the mirror plate;

FIG. 9 is a partial cross-sectional view depicting a second embodiment of the vehicle accessory according to the present invention;

FIG. 10 is a partial cross-sectional view depicting a third embodiment of the vehicle accessory according to the present invention; and FIG. 11 is a partial cross-sectional view depicting a fourth embodiment of the vehicle accessory according to the present invention.

DESCRIPTION OF THE PREFERRED EMBODIMENTS

Preferred embodiments of the vehicle accessory according to the present invention will now be described with reference to the drawings.

First Embodiment

Figure 1:
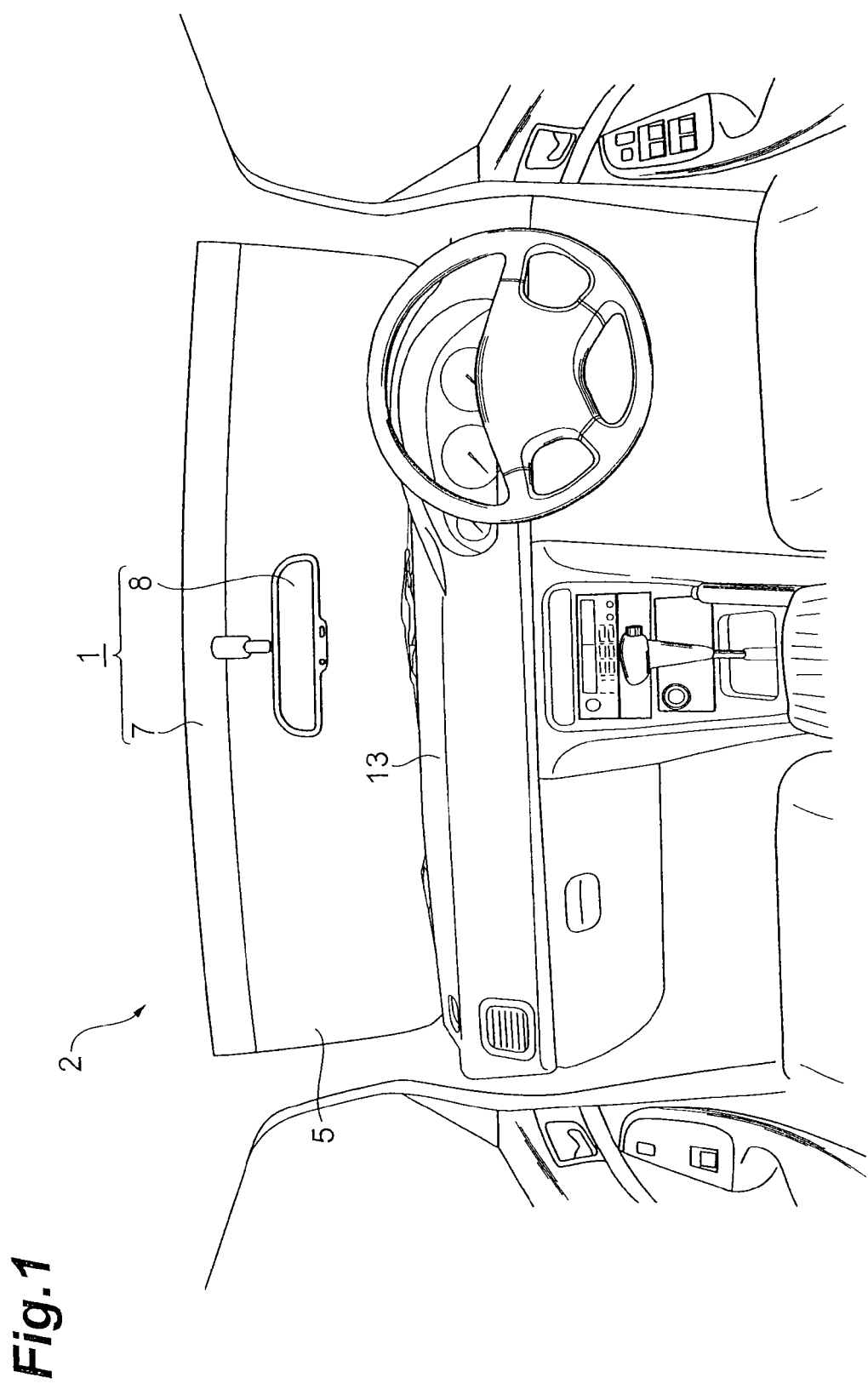
FIG. 1 is a perspective view depicting a vehicle having the vehicle accessory according to the present invention.
Figure 2:
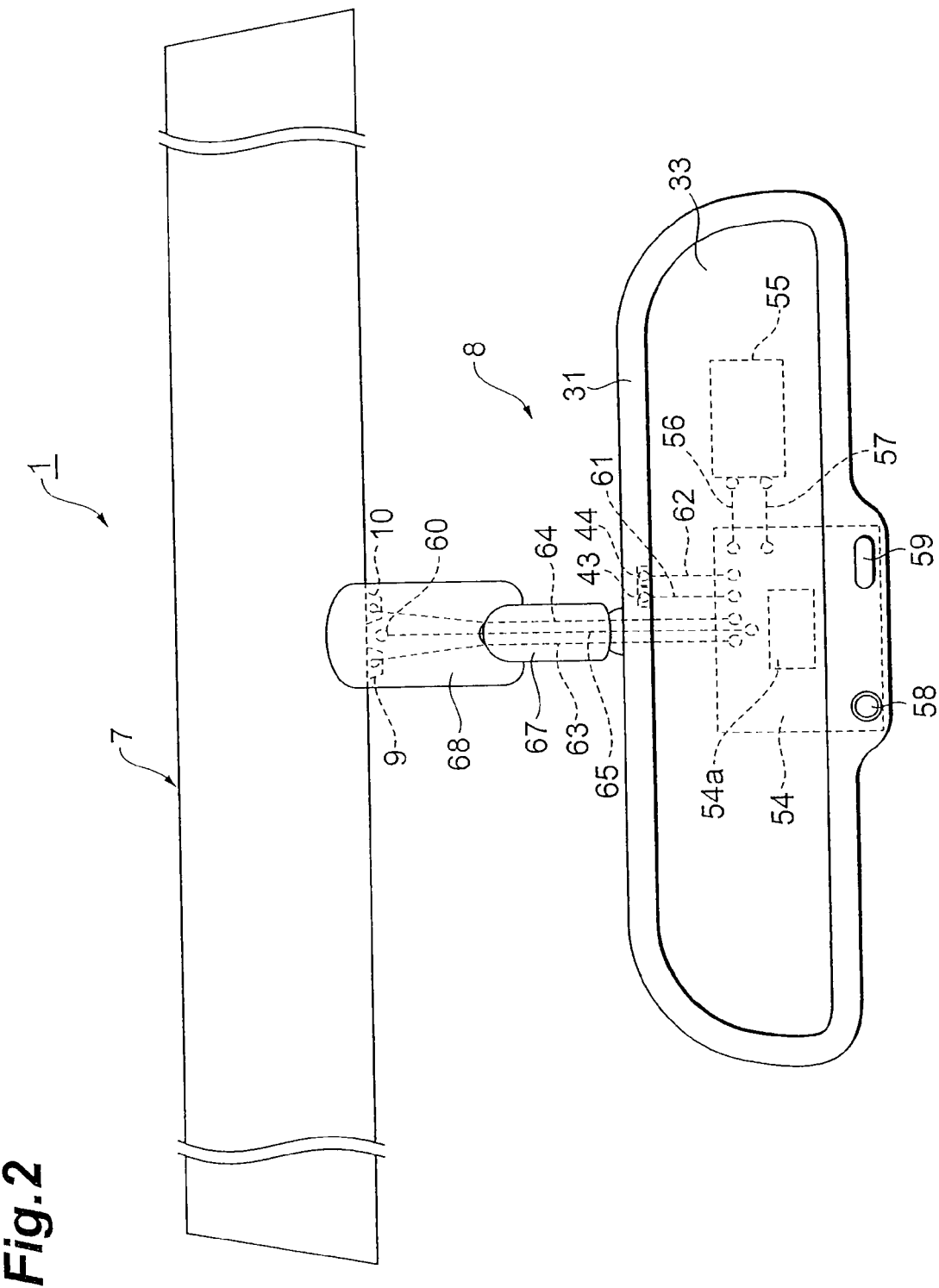
FIG. 2 is a plan view depicting a first embodiment of the vehicle accessory according to the present invention.
Figure 3:
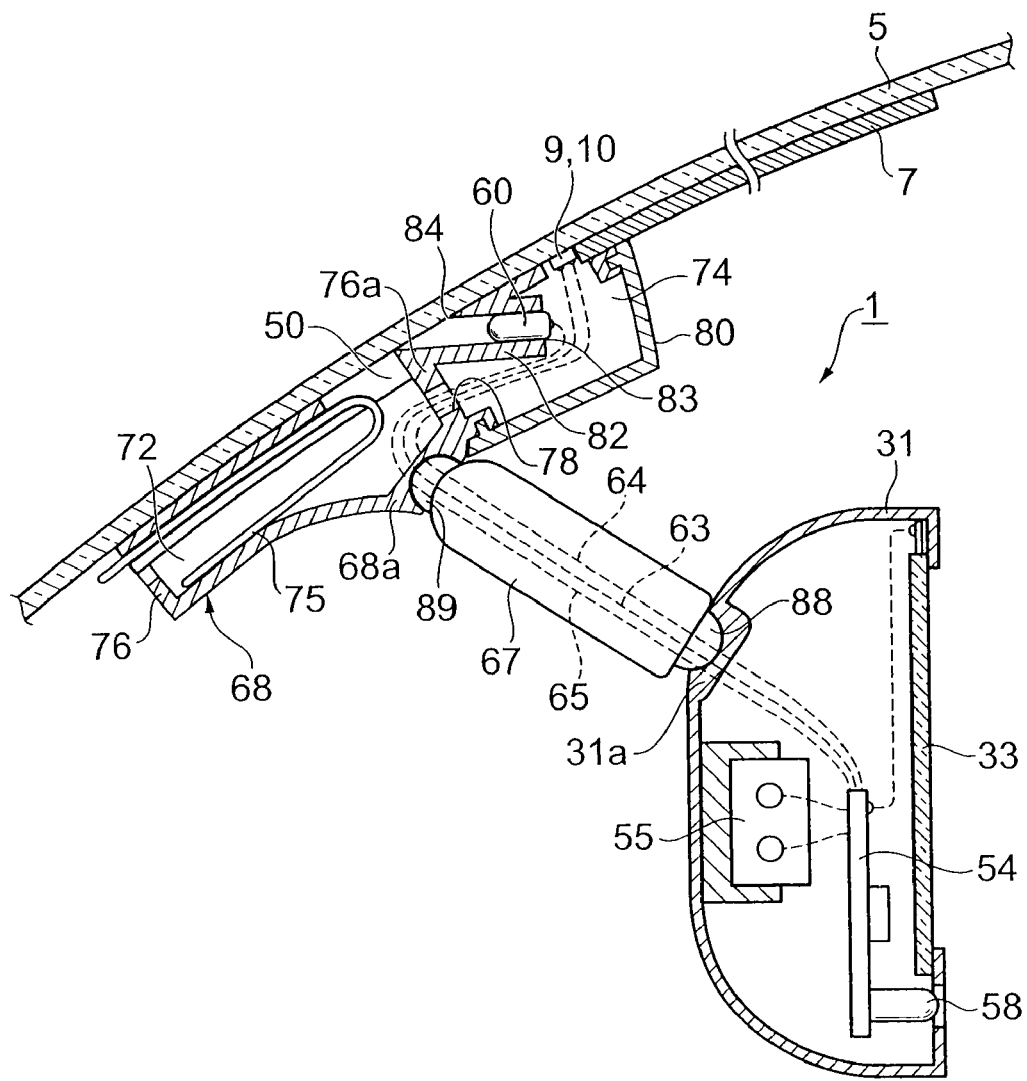
FIG. 3 is a cross-sectional view depicting the vehicle accessory shown in FIG. 1.

As FIG. 1 to FIG. 3 show, a vehicle accessory 1 has a light controlling sheet 7 for preventing glare by sunlight, and a rear view mirror 8 for insuring the rear view of a vehicle 2. As FIG. 1 shows, the light controlling sheet is attached to a windshield 5, and the rear view mirror 8 is secured to the windshield 5.

The light controlling sheet 7 is a flexible transparent sheet, and is attached to the upper portion of the windshield 5 so as to block sunlight, as shown in FIG. 1. The light controlling sheet 7 is rectangular, and is attached such that the longitudinal direction is along the width direction of the windshield 5. As FIG. 2 shows, a pair of electrode lead out portions 9 and 10, for applying voltage to the light controlling sheet 7, protrude from the bottom edge (edge at the dash board 13 side in FIG. 1) of the light controlling sheet 7, and the electrode lead out portions 9 and 10 are positioned around the center in the longitudinal direction of the light controlling sheet 7. The electrode lead out portions 9 and 10 are covered by the base 68 of the rear view mirror 8.

In the light controlling sheet 7 of which light transmittance changes, a guest host liquid crystal layer 21 is disposed between a pair of transparent films 15 and 16, as (a) of FIG. 4 shows. The guest host liquid crystal layer 21 is a layer containing liquid crystals and dye, and transmits light when voltage is not applied, but if voltage is applied, the orientation direction of the guest host liquid crystal layer 21 changes, and the guest host layer 21 becomes a colored slate, and light transmittance decrease. The guest host liquid crystal layer 21 is between a pair of orientation films 17 and 19, and the edge of the guest host liquid crystal layer 21 is sealed with adhesive 23. In the guest host liquid crystal layer 21, transparent conductive films 25 and 26, for applying voltage, are formed between the transparent films 15 and 16 and the orientation films 17 and 19. A part of the transparent conductive films 25 and 26 protrudes from the adhesive 23, and becomes the electrode lead out portions 9 and 10 of the light controlling sheet 7. In the light controlling sheet 7, the range of the light transmittance variable ratio is increased by using the guest host liquid crystal layer 21. The light transmittance of the light controlling sheet 7 having this configuration changes according to the magnitude of voltage to be applied.

Concerning the materials of each composing element, an example of the material of the transparent films 15 and 16 is PET (polyethylene terephthalate). If PET is used for the transparent films 15 and 16, flexibility of the light controlling sheet 7 becomes very good, and the light controlling sheet 7 can be attached to the windshield 5 with adhesive. An example of the material of the orientation films 17 and 19 is polyimide resin, and examples of the material of the transparent conductive films 25 and 26 are ITO (indium tin oxide) and $SnO_2$ (tin oxide). The light controlling sheet 7 is always an achromatic color, regardless the light transmittance of the guest host liquid crystal layer 21. Therefore the color of traffic lights, sign posts or the like can always be identified in a state where the light controlling sheet 7 is attached. The guest host liquid crystal layer 21 has an achromatic color, and when tone is represented by a L*a*b* color system, and the a* and b* values are within ±30, more preferably ±20.

As FIG. 2 and FIG. 3 show, the rear view mirror 8, disposed diagonally to the front of the driver, has a mirror housing 31 made of resin. The mirror housing 31 is installed such that the front face faces the back of the vehicle 2, and the rear face faces the front of the vehicle 2.

A mirror plate 33 is secured to the front face of the mirror housing 31. The mirror plate 33, of which light reflectance changes, has electrode lead out portions 43 and 44. In the mirror plate 33, an electro-chromatic layer 41, of which edge is sealed with adhesive 42, is disposed between a pair of transparent glass plates 35 and 36, as (b) of FIG. 4 shows. The electro-chromatic layer 41 is a layer containing electro-chromatic material and solvent, and transmits light as is when voltage is not applied, but if voltage is applied, the electro-chromatic layer 41 becomes a colored state because of an oxidation reduction reaction, and its light transmittance decrease. Voltage is applied to the electro-chromatic layer 41 via a transparent conductive film 37 and reflective film 39 which sandwich the electro-chromatic layer 41. A part of the transparent conductive film 37 and the reflective film 39 protrudes from the adhesive 42, and becomes the electrode lead out portions 43 and 44 of the mirror plate 33.

In the mirror plate 33 having the above configuration, the light transmittance of the electro-chromatic layer 41 changes according to a value of voltage applied via the transparent conductive film 37 and the reflective film 39, and the quantity of light which enters the reflective film 39 also changes. Therefore the light reflectance of the mirror plate 33 changes according to the magnitude of voltage. An example of the electro-chromatic material is viologen, and an example of the solvent is propylene carbonate. Examples of the material of the transparent conductive film 37 are ITO and $SnO_2$, and examples of the material of the reflective film 39 are Rh, Ag, Al, Cr and Ru.

As FIG. 2 shows, a rear light receiving sensor 58 for measuring the illumination intensity in the vehicle is exposed from the lower center side of the front face of the mirror housing 31. Since the rear light receiving sensor 58 faces the rear of the vehicle 2, the light irradiated from a vehicle behind the vehicle 2 can also be detected. The rear light receiving sensor 58 is connected to a circuit board 54 for applying voltage to the mirror plate 33 and the light controlling sheet 7, and outputs electric signals according to the measured illumination intensity to the circuit board 54.

A push button switch 59 is exposed from the lower center of the front face of the mirror housing 31. The switch 59 is for controlling the ON/OFF of the rear light receiving sensor 58 and the later mentioned front light receiving sensor 60, and the rear light receiving sensor 58 and the front light receiving sensor 60 can receive light when the switch 59 is in the ON state.

As FIG. 2 and FIG. 3 show, a circuit board 54 is enclosed inside the mirror housing 31. When the switch 59 is in the ON state, the circuit board 54, on which a control IC 54a is mounted, applies voltage to the mirror plate 33 via the wires 61 and 62 which are lead wires based on the illumination intensity measured by the rear light receiving sensor 58 and the illumination intensity measured by the front light receiving sensor 60, and also applies voltage to the light controlling sheet 7 via the wires 63 and 64 which are lead wires. The operation of the circuit board 54 will be described in detail later.

As FIG. 2 and FIG. 3 show, a power supply portion 55 for supplying power to the circuit board 54 is enclosed inside the mirror housing 31. The power supply portion 55 has a built-in battery, and the power supply portion 55 and the circuit board 54 are connected with the wires 56 and 57, which are lead wires. Power is supplied from the power supply portion 55 to the circuit board 54 via these wires 56 and 57. Since the power supply portion 55 is in the mirror housing 31, the wire to supply power to the circuit board 54 can be short.

As FIG. 3 shows, a spherical concave portion 31a for connecting a pivot 88 by a ball joint structure is formed on a rear face of the mirror housing 31. The pivot 88 is disposed on one end of a stay 67, which protrudes from the windshield 5 to inside the vehicle, and the mirror housing 31 is supported by the stay 67 via the pivot 88. A pivot 89 is disposed in the other end of the stay 67, and the pivot 89 is connected to the spherical concave portion 68a of the base 68 secured to the windshield 5 by a ball joint structure.

The insides of the stay 67 and the pivots 88 and 89 are hollow and connected. The inside of the pivot 88 is connected to the inside of the mirror housing 31 through a via hole formed inside the spherical concave portion 31a, and the inside of the pivot 89 is connected to the inside of the base 68 through a via hole formed inside the spherical concave portion 68a. In the internal space of the stay 67 and the pivots 88 and 89, a wire 63, which connects the electrode lead out portion 9 of the light controlling sheet 7 in the base 68 and the circuit board 54 in the mirror housing 31, a wire 64, which connects the electrode lead out portion 10 of the light controlling sheet 7, and the circuit board 54, and a wire 65, which connects the front light receiving sensor 60 in the base 68 and the circuit board 54, penetrate through. The stay 67 and the pivots 88 and 89 are formed of opaque resin or metal, therefore the wires 63 to 65 are invisible from outside view.

As FIG. 3 shows, the base 68, supporting the stay 67, is removably attached to a mounting plate 50 which is bonded and secured to the windshield 5. The base 68 includes a plate housing space 72 for housing the mounting plate 50 and a spring 75 for resiliently holding the mounting plate 50, and an electrode housing space 74 for housing the electrode lead out portions 9 and 10 of the light controlling sheet 7.

The plate housing space 72 is surrounded by a first wall portion 76 of the base 68. The first wall portion 76 is engaged with a mounting plate 50, and an upper side wall portion 76a located in the upper part of the windshield 5, out of the first wall portion 76, contacts the mounting plate 50. By engaging the first wall portion 76 with the mounting plate 50 and contacting the upper side wall portion 76a with the mounting plate 50, the base 68 is secured to the mounting plate 50. In the upper side wall portion 76a, a via hole 78, to connect the plate housing space 72 and the electrode housing space 74, is formed.

The electrode housing space 74 is located on the windshield 5 above the plate housing space 72, and is surrounded by the upper side wall portion 76a and a cover element 80 which is removable from the upper side wall portion 76a. In the electrode enclosing space 74, a front light receiving sensor 60 for measuring the illumination intensity of the sunlight entering from the front of the vehicle is housed, in addition to the electrode lead out portions 9 and 10 of the light controlling sheet 7.

The front light receiving sensor 60 is disposed in a cylindrical portion 82 created in the electrode housing space 74. One end of the cylindrical portion 82 is integrated with the upper side wall portion 76a, and an opening 84 at one end of the cylindrical portion 82 faces the windshield 5. The axis direction of the hole of the cylindrical portion 82 is roughly in parallel with the traveling direction of the vehicle. The front light receiving sensor 60 is inserted from the opening 83 on the other end of the cylindrical portion 82, and is located at a position recessed from the opening 84 at one end of the cylindrical portion 82.

If the sun is on the axis of the hole of the cylindrical portion 82, the sunlight enters the hole of the cylindrical portion 82, and therefore illumination intensity measured by the front light receiving sensor 60 increases. If the position of the sun becomes higher than the axis of the hole of the cylindrical portion 82, the sunlight no longer enters the hole of the cylindrical portion 82, and therefore the illumination intensity measured by the front light receiving sensor 60 decreases.

The wires 63 to 65 connected to the circuit board 54 extend from the front light receiving sensor 60 and the electrode lead out portions 9 and 10 of the light controlling sheet 7. These wires 63 to 65 reach the plate housing space 72 through the via hole 78 in upper side wall portion 76a, and then reach the circuit board 54 in the mirror housing 31 via the spherical concave portion 68a of the base 68, pivot 88, stay 67, pivot 89, and the spherical concave portion 31a of the mirror housing 31. Since the cover element 80 is removable, the electrode lead out portions 9 and 10, front light receiving sensor 60 and wires 63 to 65 can be connected with the cover element 80 removed, which makes the wire connection operation easier.

Now operation of the circuit board 54, to which the electrode lead out portions 9 and 10 of the light controlling sheet 7 and front light receiving sensor 60 are connected, will be described in detail. As FIG. 5 shows, the circuit board 54, on which the control IC 54a is mounted, has input unit 90, which receives electric signals according to the measured illumination intensity from the front light receiving sensor 60 and the rear light receiving sensor 58, storage unit 91 in which combinations of the illumination intensity of the sunlight and the illumination intensity inside the vehicle are stored in advance, and voltage output unit 92 for applying voltage to the light controlling sheet 7 based on the electric signals which the input unit 90 received from the front light receiving sensor 60 and the rear light receiving sensor 58, and combinations stored in the storage unit 91.

When the input unit 90 receives the electric signals from the front light receiving sensor 60 and the rear light receiving sensor 58 respectively, the voltage output unit 92 specifies the illumination intensity of the sunlight received by the front light receiving sensor 60 and the illumination intensity inside the vehicle received by the rear light receiving sensor 58 from these electric signals. The specified illumination intensity of the sunlight and illumination intensity inside the vehicle are compared with combinations of the illumination intensity of the sunlight and illumination intensity inside the vehicle stored in the storage unit 91, and it is judged whether the voltage is applied to the light controlling sheet 7.

In the storage unit 91, combinations of the illumination intensity of the sunlight which enters from the front of the vehicle and illumination intensity inside the vehicle for applying voltage to the light controlling sheet 7 have been stored in advance. FIG. 6 is a graph showing the relationships of the illumination intensity of the sunlight which enters from the front of the vehicle, the illumination intensity inside the vehicle, and the glare the driver experiences. "ON area" shown in FIG. 6 is a range where the driver experienced glare, and "OFF area" is a range where the driver did not experience glare. In the storage unit 91, combinations of the illumination intensity of the sunlight entering from the front of the vehicle and the illumination intensity inside the vehicle, which are included in the "ON area" in FIG. 6, have been stored as a table.

The driver experiences glare when the sun is seen through the windshield. When the sun is seen through the windshield, the sunlight is not only strongly irradiated onto the windshield 5, but also enters inside the vehicle. This is why in FIG. 6, an area, where both the illumination intensity of the sunlight entering from the front of the vehicle and the illumination intensity inside the vehicle are generally high, becomes the "ON area" (range where the driver experiences glare).

When the sun is at a high position where the driver cannot see it, on the other hand, the driver does not experience glare. When the sun is in such a position, the sunlight is irradiated onto the windshield 5, but little sunlight enters the vehicle. This is why in FIG. 6, an area, where the illumination intensity of the sunlight entering from the front of the vehicle is high and the illumination intensity inside the vehicle is low, becomes the "OFF area" (range where the driver does not experience much glare). The driver does not experience glare after sunset and in cloudy weather as well. After sunset and in cloudy weather, both from outside the vehicle and inside the vehicle are dark. This is why in FIG. 6, an area, where both the illumination intensity of the sunlight entering the front of the vehicle and the illumination intensity inside the vehicle are low, becomes the "OFF area".

The voltage output unit 92 compares a combination of the illumination intensity of the sunlight received by the front light receiving sensor 60 and the illumination intensity inside the vehicle received by the rear light receiving sensor 58 with the content of the table. If the combination of the illumination intensity of the sunlight received by the front light receiving sensor 60 and the illumination intensity inside the vehicle received by the rear light receiving sensor 58 is included in the table of the storage unit 91, voltage is applied to the light controlling sheet 7. Thereby the light transmittance of the light controlling sheet 7 is decreased, and sunlight can be blocked when the driver experiences glare. If the combination of the illumination intensity of the sunlight received by the front light receiving sensor 60 and the illumination intensity inside the vehicle received by the rear light receiving sensor 58 is not included in the table of the storage unit 91, on the other hand, the voltage output unit 92 prohibits voltage from being applied to the light controlling sheet 7. Thereby the light transmittance of the light controlling sheet 7 is not decreased when the driver does not experience glare.

The voltage to be applied to the light controlling sheet 7 may be a value based on the illumination intensity of the sunlight received by the front light receiving sensor 60, or may be a value based on the difference between the illumination intensity of the sunlight received by the front light receiving sensor 60 and the illumination intensity inside the vehicle received by the rear light receiving sensor 58. Or a voltage value to be applied to the light controlling sheet 7 may be corresponded to the combination of the illumination intensity of the sunlight and the illumination intensity inside the vehicle in the table, so that the voltage value shown in the table may be applied to the light controlling sheet 7. A constant value may also be used.

The voltage output unit 92 of the circuit board 54 also compares the illumination intensity measured by the front light receiving sensor 60 and the illumination intensity measured by the rear light receiving sensor 58, and applies a voltage according to the difference thereof to the mirror plate 33 via the wires 61 and 62 if the illumination intensity measured by the rear light receiving sensor 58 is higher. Thereby the light transmittance of the mirror plate 33 is changed if a strong light is irradiated from a vehicle driving behind at night, and as a result, the mirror plate 33 can function as a glare-proof mirror. In the present embodiment, voltage according to the difference of the measured illumination intensities is applied to the mirror plate 33, but voltage according to only the illumination intensity measured by the rear light receiving sensor 58 may be applied to the mirror plate 33.

As described above, in the vehicle accessory 1, sunlight is blocked by changing the light transmittance of the light controlling sheet 7 attached to the windshield 5. Therefore the light can be blocked more electrically compared to a device which blocks light by mechanically moving components.

In the vehicle accessory 1, the front light receiving sensor 60 measures the illumination intensity of the sunlight entering from the front of the vehicle, and the rear light receiving sensor 58 measures the illumination intensity inside the vehicle, whereby it can be judged whether the sun is at the glare position, that is, whether light should be blocked. If the necessity of blocking the light is judged only based on the measurement result of the front light receiving sensor 60, the direction of the front light receiving sensor 60 must accurately match the direction of the sunlight whereby the driver experiences glare, but if not only the brightness of the sunlight but also the brightness inside the vehicle is measured, as in the case of the present embodiment, light can be blocked whenever the driver experiences glare, even if the position of the front light receiving sensor 60 deviates somewhat.

In the vehicle accessory 1, if a combination of the illumination intensity of the sunlight received by the front light receiving sensor 60 and the illumination intensity inside the vehicle received by the rear light receiving sensor 58 is a combination stored in the storage unit 91, voltage is applied to the light controlling sheet 7. Therefore, if a plurality of combinations of the illumination intensity of the sunlight and the illumination intensity inside the vehicle are stored in the storage unit 91 as a table, then the necessity of applying voltage to the light controlling sheet 7 can be closely controlled.

In the vehicle accessory 1, the front light receiving sensor 60 is housed in the base 68, so the position of the front light receiving sensor 60 is not changed, even if the mirror housing 31 is moved. Therefore even when the drive adjusts the angle of the mirror plate 33, the direction of the front light receiving sensor 60, with respect to the windshield 5, can be maintained to be constant.

In the vehicle accessory 1, the cylindrical portion 82 is created in a base 68, that is, an element located relatively close to the driver, and the axis direction of the hole is along the traveling direction of the vehicle. In other words, the axis direction of the hole of the cylindrical portion 82 roughly matches the line of sight of the driver. Therefore the illumination intensity measured by the front light receiving sensor 60 in the hole of the cylindrical portion 82 increases if the sun is at a position where the driver can see it via the windshield, and decreases if the sun is at a high position where the driver cannot see it. Therefore the illumination intensity measured by the front light receiving sensor 60 can be changed considerably depending on whether the sunlight is coming from a direction where the driver is bothered by glare or from a direction where the driver is not bothered by glare, and the light controlling sheet 7 can be more accurately operated.

Now various variant forms to be applied to the mirror place 33 of the first embodiment will be described.

As (a) of FIG. 7 shows, a mirror plate 120 according to a first variant form has a pair of transparent glass plates 121 and 122, and an electrolyte layer 125, which is positioned between the glass plates 121 and 122, and is also sandwiched by transparent conductive films 123 and 124. A circular adhesive 126 is placed between the transparent conductive films 123 and 124, and the electrolyte layer 125 is disposed in an area enclosed by the adhesive 126. A $WO_3$ layer 128 is formed between the electrolyte layer 125 and the transparent conductive film 123. A reflective film 129 is formed on the surface opposite the transparent conductive film 124 on the glass plate 122, and an exposed surface of the reflective film 129 is covered by a protective material 130. A part of the transparent conductive films 123 and 124 protrudes from the adhesive 126, and these protruding portions become the electrode lead out portions of the mirror plate 120, and are connected with the circuit board 54 via the wires 61 and 62.

The material of the transparent conductive films 123 and 124 is the same as that of the transparent conductive film 37 of the first embodiment, and the material of the electrolyte layer 125 is a solvent, such as the electrolytes of LiI or $LiClO_4$, or polypylene carbonate. The material of the reflective film 129 is the same as that of the reflective film 39 of the first embodiment.

As (b) of FIG. 7 shows, the mirror plate 140 of the second variant form has a transparent glass plate 141, transparent conductive film 142, $IrO_x$ layer 143, $Ta_2O_5$ layer 144, $WO_3$ layer 145, reflective film 146, and transparent glass plate 147, which are layered in this order. The transparent conductive film 142 and glass plate 147, and the reflective film 146 and glass plate 147 are bonded with adhesive 148 respectively. The transparent conductive film 142 and reflective film 146 are also bonded with adhesive 149. In the mirror plate 140, the transparent conductive film 142 and reflective film 146 are connected with the circuit board 54 via the wires 61 and 62.

An example of the material of the adhesives 148 and 149 is epoxy resin. The material of the transparent conductive film 142 is the same as that of the transparent conductive film 37 of the first embodiment, and the material of the reflective film 146 is the same as that of the reflective film 39 of the first embodiment.

As (a) of FIG. 8 shows, the mirror plate 150 of the third variant form has a pair of transparent glass plates 151 and 152, and a pair of transparent conductive films 153 and 154, which are positioned between the glass plates 151 and 152. The transparent conductive films 153 and 154 are bonded with a circular adhesive 155, and a guest host liquid crystal layer 158 sandwiched by a pair of orientation films 156 and 157 is disposed in an area enclosed by the adhesive 155. A reflective film 159 is formed between the transparent conductive film 154 and glass plate 152. In the mirror plate 150, the transparent conductive films 153 and 154 are connected with the circuit board 54 via the wires 61 and 62.

The material of the transparent conductive films 153 and 154 is the same as that of the transparent conductive film 37 of the first embodiment, and the material of the reflective film 159 is the same as that of the reflective film 39 of the first embodiment. An example of the material of the orientation films 156 and 157 is polyimide resin.

As (b) of FIG. 8 shows, the mirror plate 160 of the fourth variant form has a pair of transparent glass plates 161 and 162, and a pair of transparent conductive films 163 and 164 which are positioned between the glass plates 161 and 162. The transparent conductive films 163 and 164 are bonded with a circular adhesive 165, and a guest host liquid crystal layer 168 sandwiched by a pair of orientation films 166 and 167 is disposed in an area enclosed by the adhesive 165. A plastic sheet 169 is disposed between the glass plate 161 and the transparent conductive film 163, and the plastic sheet 169 is secured on the glass plate 161 with adhesive 170. A reflective film 171 is disposed between the glass plate 162 and the transparent conductive film 164, and a plastic sheet 172 is disposed between the reflective film 171 and the transparent conductive film 164. The plastic sheet 172 is secured to the reflective film 171 by being bonded with adhesive 173. In the mirror plate 160, the transparent conductive films 163 and 164 are connected with the circuit board 54 via the wires 61 and 62.

The material of the transparent conductive films 163 and 164 is the same as that of the transparent conductive film 37 of the first embodiment, the material of the reflective film 171 is the same as that of the reflective film 39 of the first embodiment, and the material of the orientation films 166 and 167 is the same as that of the orientation films 156 and 157 of the third variant form. An example of the material of the plastic sheets 169 and 172 is PET, and examples of the material of the adhesives 170 and 173 are PVB (polyvinyl butyral), EVA (ethylene-vinyl acetate), acrylic and epoxy resin.

Second Embodiment

As FIG. 9 shows, in the vehicle accessory according to the second embodiment, the front light receiving sensor 60 can be moved along the axis of the hole of the cylindrical portion 82.

In the vehicle accessory according to the second embodiment, the front light receiving sensor 60 is secured to a pedestal (position adjustment unit) 202. One end of the pedestal 202 is inserted into the hole of the cylindrical portion 82, so that [the pedestal 202] can move backward and forward along the axis of the hole of the cylindrical portion 82. One end of the pedestal 202 is pressed to fit into the hole of the cylindrical portion 82, so as not to become disengaged from the cylindrical portion 82. The position of the front light receiving sensor 60 secured to the pedestal 202 in the hole of the cylindrical portion 82 changes by the pedestal 202 sliding in the axis direction of the hole of the cylindrical portion 82. And the light receiving angle of the front light receiving sensor 60 is changed by a change in the position of the front light receiving sensor 60. For example, if the front light receiving sensor 60 near the opening 83 of the cylindrical portion 82 is moved toward the opening 84 of the cylindrical portion 82, the angle range where the front light receiving sensor 60 can receive light increases.

A flange portion 203, for controlling the moving amount of the pedestal, is created on the other end of the pedestal 202, and the flange portion 203 has a size greater than the opening 83. The movement of the pedestal 202 is controlled by the flange portion 203 contacting one end of the cylindrical portion 82, and the front light receiving sensor 60 is prevented from protruding from the opening 84. The pedestal 202 and the flange portion 203 are hollow inside, where the wire 65, extending from the front light receiving sensor 60, is inserted.

The mounting angle of the base 68 is different depending on the inclination of the windshield 5 with respect to the traveling direction of the vehicle 2. If this angle changes, the light receiving angle of the front light receiving sensor enclosed in the base changes, and in some cases, the sunlight with which the driver experiences glare may not be received. In the vehicle accessory according to the second embodiment, the position of the front light receiving sensor 60 in the hole of the cylindrical portion 82 can be changed by moving the pedestal 202, whereby the front light receiving sensor 60 can be moved forward or backward to/from the opening 84. As a result, the light receiving angle of the front light receiving sensor 60 can be adjusted, and sunlight from an angle at which the driver experiences glare can always be received by the front light receiving sensor 60. Therefore the light controlling sheet 7 can always be operated when light must be blocked.

Third Embodiment

As FIG. 10 shows, in a vehicle accessory according to the third embodiment, the front light receiving sensor 60 can be moved by a mechanism that is different from that of the second embodiment. In the vehicle accessory according to the third embodiment, the front light receiving sensor 60 is secured in a pedestal (position adjustment unit) 222 connected with a male screw 224. The pedestal 222, along with the front light receiving sensor 60, are enclosed in the hole of the cylindrical portion 82, and the male screw 224 extending from the pedestal 222 is engaged with a female screw 228 formed at an opening 83 of one end of the cylindrical portion 82. By the male screw 224 and the female screw 228 engaging, the front light receiving sensor 60 secured in the pedestal 222 moves. In the hole of the cylindrical portion 82, a coil spring 229, to prevent loosening of the male screw 224, is disposed between the pedestal 222 and one end of the cylindrical portion 82. The coil spring 229 encloses the male screw 224 and also contacts one end of the pedestal 222 and the cylindrical portion 82.

One end of the male screw 224 is secured to the concave portion formed in the pedestal 222. A gap is created between one end of the male screw 224 and the inner surface of the concave portion of the pedestal 222, so that rotation of the male screw 224, when engaging, is not transferred to the pedestal 222. On the other end of the male screw 224, positioned outside the opening 83 of the cylindrical portion 82, a control knob 229, which can be held by the operator, is created. If the control knob 229 is turned, the male screw 224 rotates, and the pedestal 222 and the front light receiving sensor 60 move forward or backward along the axis of the hole of the cylindrical portion 82. A wire 65, extending from the front light receiving sensor 60, is inserted into the pedestal 222 and the male screw 224, but the pedestal 222 does not rotate even if the male screw 224 is rotated, because of the structure in which the rotation of the male screw 224 during engaging is not transferred to the pedestal 222, therefore the wire 65 is not twisted.

In the vehicle accessory according to the third embodiment, the pedestal 222 can be moved by the screwing function, and the position of the front light receiving sensor 60 in the hole of the cylindrical portion 82 can be adjusted by moving the pedestal 222, and the light receiving angle of the front light receiving sensor 60 can be changed by adjusting the position of the front light receiving sensor 60. As a result, the sunlight from an angle at which the driver experiences glare can always be received by the front light receiving sensor 60.

Fourth Embodiment

As FIG. 11 shows, the cylindrical portion of the vehicle accessory according to the fourth embodiment is rotatable, unlike the third embodiment.

In the vehicle accessory according to the fourth embodiment, the front light receiving sensor 60 and the cylindrical portion 252 housing the pedestal 222 are formed separately from the upper side wall portion 76a. A tongue piece 254 is formed on the cylindrical portion 252, and a shaft hole, for a pin 255 to penetrate, is formed in the tongue piece 254. The cylindrical portion 252 and the tongue piece 254 pivot by the pin 255 penetrating the shaft hole, so as to rotate around this pin 255. The pin 255 is pressed to fit into the shaft hole, so that the position of the cylindrical portion 252 does not shift due to vibration.

In the vehicle accessory according to the fourth embodiment, if the cylindrical portion 252 is rotated, and the axis direction of the hole of the cylindrical portion 252 is matched with the direction of the sun at which the driver experiences glare, the front light receiving sensor 60 in the cylindrical portion 252 can always receive the sunlight irradiated in this direction. As a result, the light controlling sheet 7 can always be operated when the light must be blocked. In the present embodiment, the tongue piece 254 pivots using the pin 255, so that the cylindrical portion 252 can be rotated, but a ball joint structure may be used.

According to the embodiments of the present invention, the sunlight can always be blocked without mechanical operation.

What is claimed is:

1. A vehicle accessory, comprising: a light controlling sheet which is attached to a windshield of a vehicle, and of which light transmittance changes according to a value of voltage; and a rear view mirror which insures rear view of the vehicle, wherein
the rear view mirror comprises: a front light receiving sensor which measures illumination intensity of the sunlight which enters from the front of the vehicle; a rear light receiving sensor which measures illumination intensity inside the vehicle; and a circuit board which controls voltage to be applied to the light controlling sheet, and the circuit board comprises: storage unit for storing, in advance, combinations of the illumination intensity of the sunlight and the illumination intensity in the vehicle, for applying the voltage to the light controlling sheet; and voltage input unit for comparing a combination of the illumination intensity of the sunlight received by the front light receiving sensor and the illumination intensity in the vehicle received by the rear light receiving sensor, with the combinations stored in the storage unit, and applying voltage to the light controlling sheet based on the comparison result.

2. The vehicle accessory according to claim 1, wherein the rear view mirror comprises:

a mirror housing which supports a mirror plate; and a base which is connected to the mirror housing via a stay, and is fixed to the windshield, and the front light receiving sensor is housed in the base.

3. The vehicle accessory according to claim 2, wherein a cylindrical portion having an opening on a windshield side is formed in the base, and the front light receiving sensor is disposed in a hole of the cylindrical portion, at a position recessed from the opening.

4. The vehicle accessory according to claim 3, wherein the rear view mirror comprises position adjustment unit for moving the front light receiving sensor along an axis of the hole of the cylindrical portion.

* * * * *